United States Patent [19]

Adamy

[11] Patent Number: 5,691,908
[45] Date of Patent: Nov. 25, 1997

[54] METHOD FOR ACTUATOR IDENTIFICATION DURING THE TRANSVERSE PROFILE CONTROL OF A CONTINUOUS MATERIAL WEB

[75] Inventor: Jürgen Adamy, Igensdorf, Germany

[73] Assignee: Siemens Aktiengesellschaft, Munich, Germany

[21] Appl. No.: 448,349

[22] PCT Filed: Nov. 15, 1993

[86] PCT No.: PCT/DE93/01092

§ 371 Date: May 23, 1995

§ 102(e) Date: May 23, 1995

[87] PCT Pub. No.: WO94/12919

PCT Pub. Date: Jun. 9, 1994

[30] Foreign Application Priority Data

Nov. 23, 1992 [DE] Germany ............... 42 39 270.5

[51] Int. Cl.$^6$ ............... G06F 19/00; G06G 7/64; G06G 7/66
[52] U.S. Cl. ............... 364/469; 226/10; 226/15; 226/74; 226/35; 364/470; 364/474.2; 364/550; 364/471.03
[58] Field of Search ............... 364/658, 657, 364/474.35, 177, 471.03, 471.04, 469.05, 470, 474.05, 550, 469.01; 318/568.22; 226/10, 74, 15, 35, 17; 200/61.5; 53/135.3; 57/233, 235, 259, 260, 31

[56] References Cited

U.S. PATENT DOCUMENTS

| | | | |
|---|---|---|---|
| 3,774,016 | 11/1973 | Sterns et al. | 235/151.1 |
| 4,720,808 | 1/1988 | Repsch | 364/568 |
| 4,752,079 | 6/1988 | Fahmer | 280/112 |
| 5,298,122 | 3/1994 | Munch et al. | 162/259 |
| 5,541,832 | 7/1996 | Nakajima et al. | 364/148 |

FOREIGN PATENT DOCUMENTS

| | | |
|---|---|---|
| 0 364 151 | 4/1990 | European Pat. Off. . |
| 0 444 801 | 9/1991 | European Pat. Off. . |
| 0 451 742 | 10/1991 | European Pat. Off. . |

OTHER PUBLICATIONS

Soviet Intentions Illustrated, Section E1. Electrical, 27 Aug. 1980, Derwent Publications Ltd., London, SU 699 525 (Vibropribor).

Primary Examiner—Reba I. Elmore
Assistant Examiner—McDieunel Marc
Attorney, Agent, or Firm—Kenyon & Kenyon

[57] ABSTRACT

A number of identified actuators are adjusted by identical absolute values which have an effect on a web end only within a noise level. A series of transverse profile measurements are then carried out, from which in each case a previously determined mean value of the transverse profile is subtracted and the results are superimposed until a number of measuring signals, which corresponds to the actuators to be identified, stands out in a clearly recognizable fashion in terms of amplitude and/or shape from the superimposed noise components of the transverse profile.

17 Claims, 9 Drawing Sheets

METHOD FOR ACTUATOR IDENTIFICATION DURING THE TRANSVERSE PROFILE CONTROL OF A CONTINUOUS MATERIAL WEB

BACKGROUND OF THE INVENTION

The present invention relates to a method and a device for actuator identification, that is to say, more precisely, for spatially assigning actuators and their effects during the transverse profile control of a continuous material web, in particular of a paper web or plastic.

In processes for continuously producing webs of material, for example webs of film or paper, material profiles transverse to the web, such as the thickness transverse profile or basis weight transverse profile, determine the quality of the product and must therefore be met very precisely. Available in this case for control actions at the start of the process are a number of actuators arranged transverse to the material web, for example spindles, by means of which the inflow of the material at the start of the process can be more or less released. Undergoing gradual strengthening, the material web traverses the process, and its transverse profile is measured at the end of the process in a spatially discrete fashion. For specific correction of a deviation from the desired transverse profile, established by measurement at the end of the process, it is necessary to know which actuator acts on which point of the material web at the end of the process, that is to say which actuator causes which measured data. This assignment varies owing to the characteristics of the process, in particular to the unknown shrinkage of the material.

Two methods are usual for determining the spatial assignment between actuator and measuring point—also termed mapping: one consists in applying colored markings to the material at the location of the actuator, and the second method, characterized as the "Bump Test", consists in deflecting an actuator so strongly that a significant change in transverse profile can be measured at the web end. If the effect at the web end is recorded and if the relationship between its position and the site of the cause at the start of the web is determined, the result is the assignment being sought. Both methods have the disadvantage that they render the material web partially unusable, or at least worsen its characteristics owing to the discoloration undertaken or the change in the weight or the thickness.

SUMMARY OF THE INVENTION

It is the object of the invention to specify a method and a device for actuator identification which do not have this disadvantage.

This object is achieved according to the invention by means of the features specified in patent claim 1 or 8.

The method according to the invention produces the advantage that no detectable traces are left behind on the material and yet it becomes possible to identify the actuator reliably.

BRIEF DESCRIPTION OF THE DRAWINGS

Together with its further embodiments, which are characterized in subclaims, the invention is to be illustrated in more detail below with the aid of the figures.

DETAILED DESCRIPTION

Figure 1:
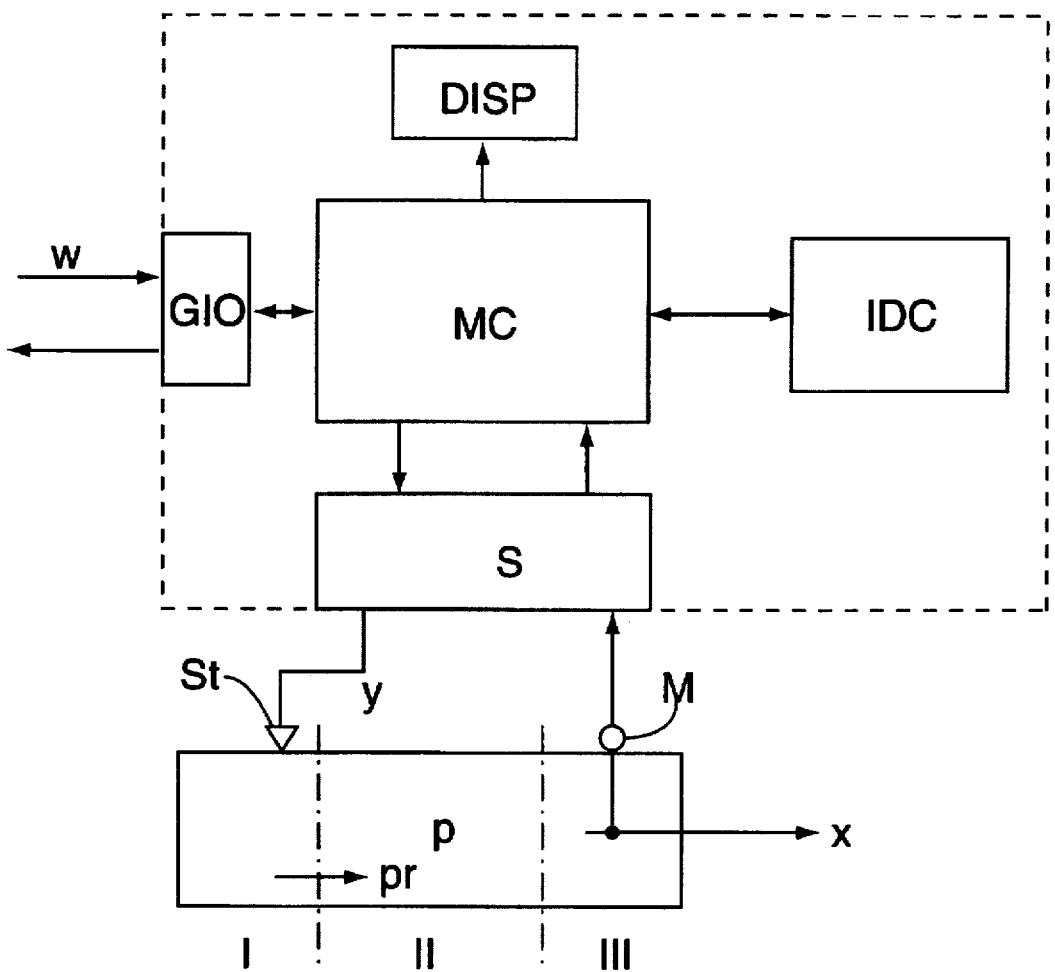
FIG. 1 shows a general block diagram for a process computer system suitable for carrying out the method according to the present invention.

FIG. 1 shows a process computer system suitable for carrying out the method according to the invention. Located in the main controller, designated by MC, is a memory programmable digital computer having a central processing unit and main, program and data memories. Via a general input/output interface denoted by GIO, the main controller MC can communicate with the outside world, in particular it is fed via this interface the desired value w for the controlled variable x of the process P. It is also usual further to provide a monitoring device or display, denoted by DISP, for visualizing interesting data. Provided between the main controller MC and the process P is an interface block denoted by S, via which the main controller is fed the controlled variable x by the controlled variable pickup, denoted by M, and via which the main controller outputs a correction variable or manipulated variable, denoted by y, to the actuator St after comparison with the desired value w has been carried out. Located as a general rule in the interface block S are analog-to-digital converters and, for the most part, also digital-to-analog converters, as well as registers for storing current data, and sample and hold elements which can be actuated by the main controller MC. The hardware components and the mode of operation of such a process computer system, also denoted as a DDC (Direct Digital Control) controller, are well known in the art and are described, for example, in European Patent 0364151 A2.

In order to carry out the method according to the invention, the identification controller, denoted by IDC, is coupled to the previously described known process computer system. The identification controller can comprise either a separate computer system which accepts data delivered by the main controller, processes them and then returns the results to the main controller again, or there can be a software program which runs on the digital computer of the main controller MC. In this case, process computer systems already present can operate in accordance with the method of the present invention without hardware equipment.

Figure 2:
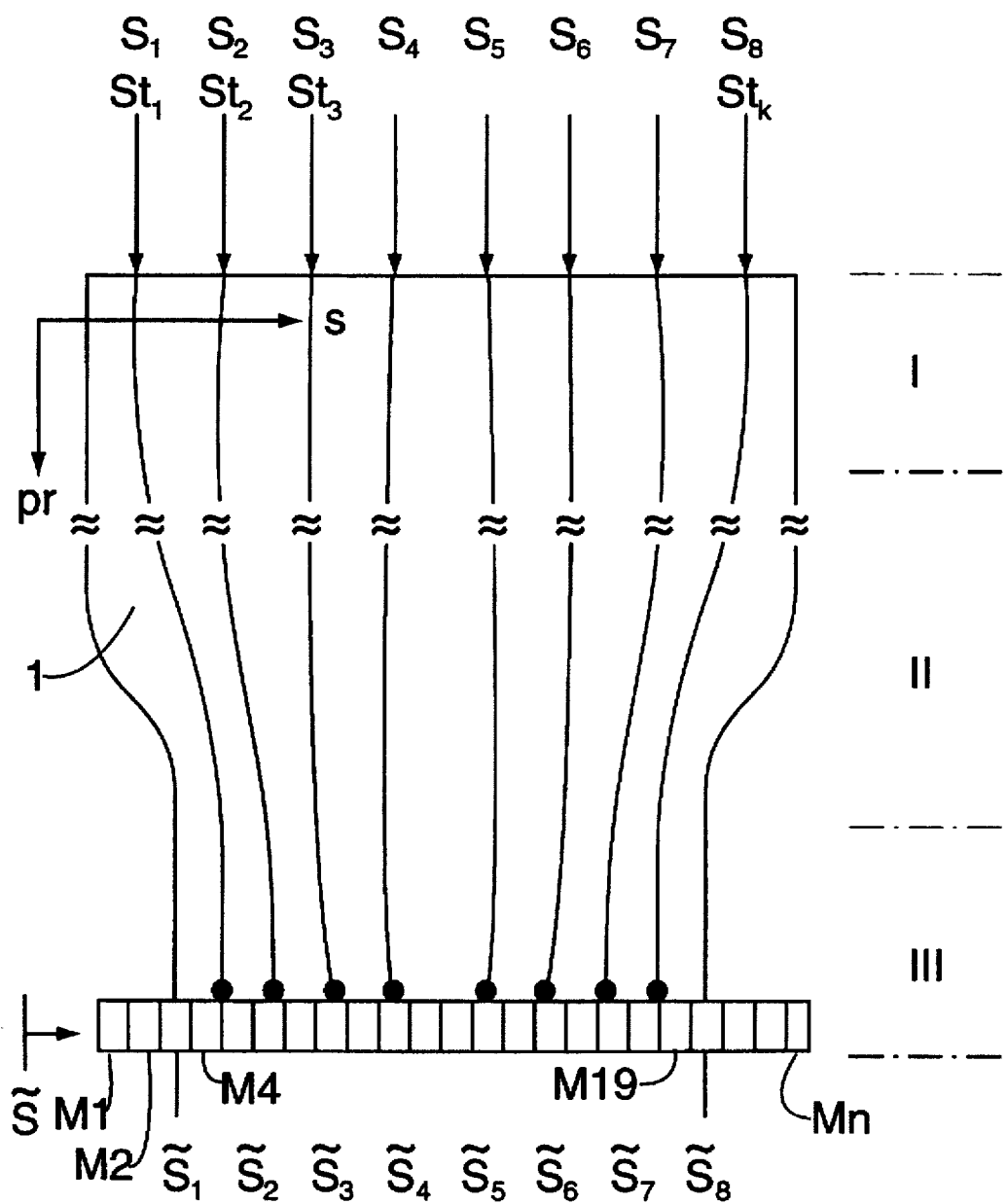
FIG. 2 shows a diagram of the production process for paper web.
Figure 3:
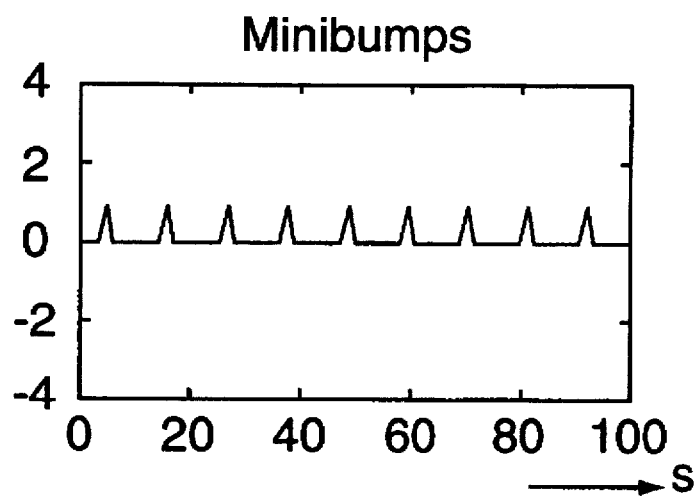
FIG. 3 shows an assumed characteristic of changes in transverse profile occurring within the noise level, as a consequence of corresponding actuation of the actuators.

FIG. 2 shows a diagram of the production process for a web of paper. At the start of the process, which is denoted by I, there are arranged transverse to the web in the coordinate direction denoted by s a multiplicity of actuators in the form of spindles which more or less release the inflow of material and of which only a fraction, specifically those denoted by St1 to Stk, are to be used for the identification. The number of the actuators present overall can, for example, be 10 times greater than the number of the actuators St1 to Stk. The actuators St1 to Stk may be taken as arranged equidistantly over the entire width of the material web 1. The actual process of paper production, which moves in the direction of the arrow denoted by pr, takes place in the section denoted by II. Here, the strengthening is performed under simultaneous reduction in volume, that is to say shrinkage of the water/cellulose suspension introduced at the start of the process, until at the end of the process, denoted by III, the final product is then produced in the form of a paper web whose basis weight profile or thickness profile is detected virtually without gaps in n marked measuring zones M1 to Mn. Paper web widths of between 3 and 9 m are usual, the individual measuring zone covering a region of approximately 1 to 10 cm. Since the extent of the shrinkage is a function of the characteristics of the process, the consistency of the suspension and the types of wood used, it cannot be predicted which actuator deflection will have an effect in which of the measuring zones, with the result that a deviation of the controlled variable x established in one measuring zone, which corresponds to the basis weight or material thickness present at this location, could not be specifically corrected.

The method according to the invention is based on a steady-state process condition in which the system is not subject to any changes in manipulated variable, that is to say any controller interventions. It has now been recognized that for this case the measured values succeeding one another in time in each measuring zone are composed of a constant component which does not depend on the number of the observed measured values and a stochastic interference and measurement error component, this stochastic component—the noise—having a normal distribution and the mean value zero. If, therefore, —as in the first method step according to the invention—the temporal mean value of the controlled variable x is determined in each measuring zone using a number of i1 measurements and stored, and this mean value is then respectively subtracted from the measurement results in the case of subsequent i2 measurements, it is possible to separate the stochastic interference component.

After the mean value has been formed, the actuators St1 to Stk are adjusted in such a way that at the end of the process a small local profile change corresponding to a change of $\alpha\sigma$ in measuring signal occurs, where $\sigma$ signifies the standard deviation of the stochastic interference. So that such adjustments, denoted as "minibumps" below, are lost in the noise and thus do not worsen the profile, the factor $\alpha$ should be selected approximately equal to one, this value having proved itself to be advantageous for a quick recognition. In the next process steps, transverse profiles from which the mean value determined in the preceding method step has respectively been subtracted are superimposed additively. With an increasing number of such superimpositions, the minibumps assert themselves over the summed noise values, because they always have an effect of constant magnitude at the same location, until they can finally unambiguously be detected as such so that the actuators causing them are identified.

Figure 4:
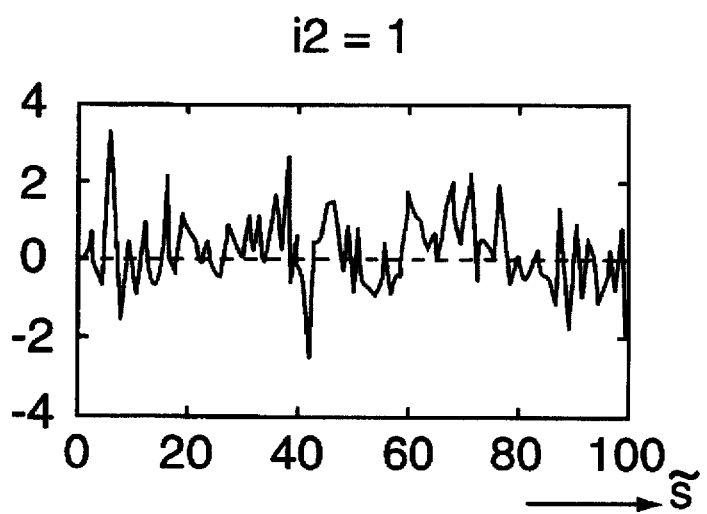
FIGS. 4 to 6 show superimposition diagrams for different iteration steps on the basis of changes in manipulated variables (minibumps) in accordance with FIG. 3.
Figure 5:
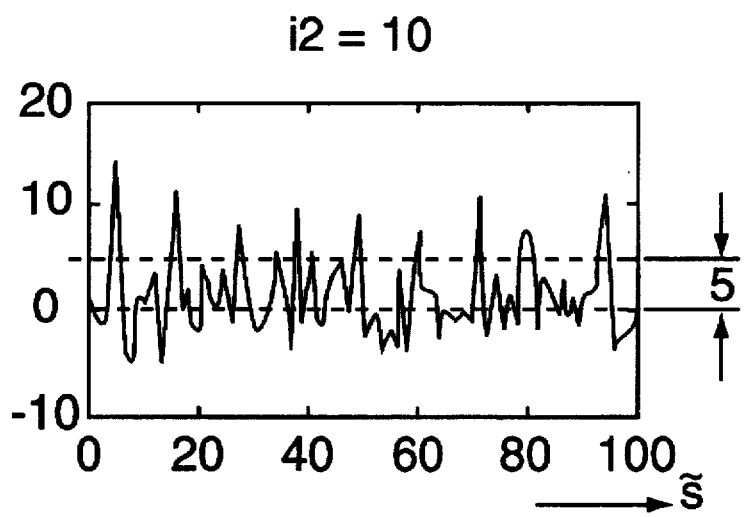
Figure 6:
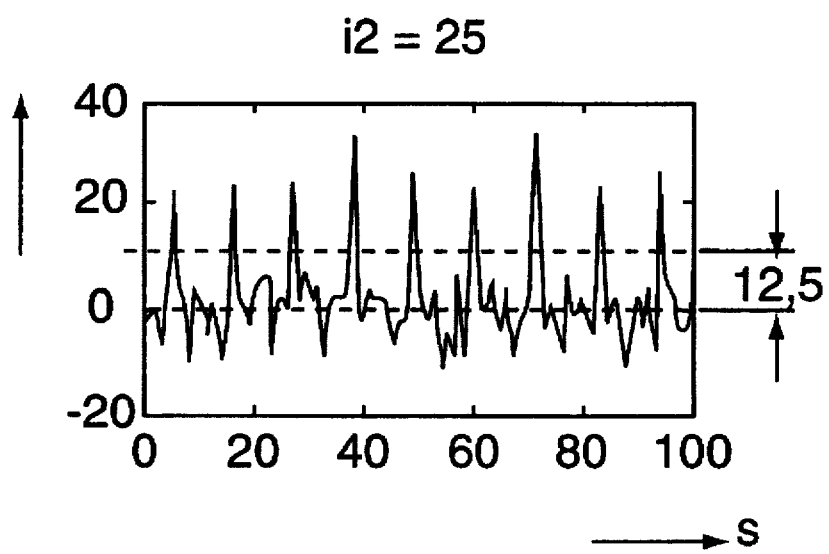
Figure 8:
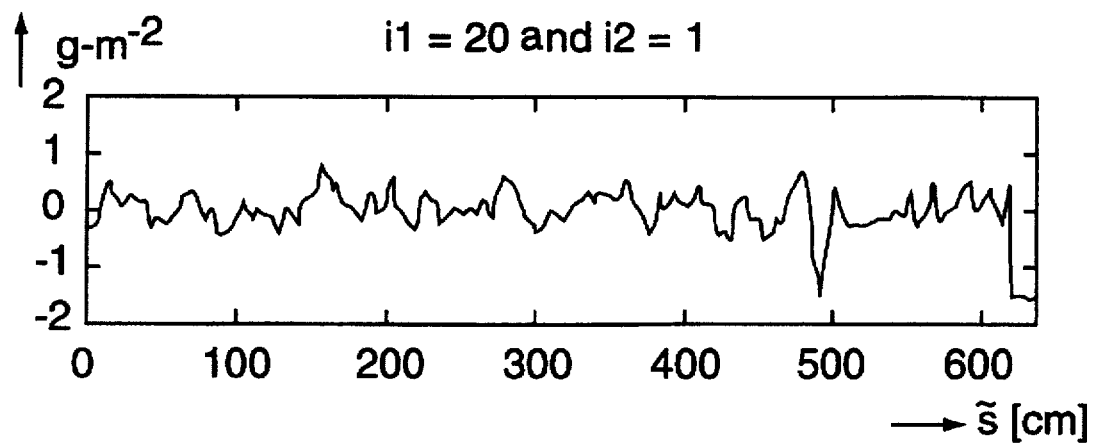
FIGS. 8 to 11 show superimposition diagrams, obtained with the aid of the method according to the invention, for different iteration steps in the case of the deflection of three actuators.

The aim of FIGS. 3 to 6 is, for example, to show, with the aid of a simulation, how when the method according to the invention is permanently applied the interference determined asserts itself in the form of minibumps by comparison with the irregular, undetermined interference in the form of stochastic process noise. The spatial coordinates of the measuring zones and the values for the measured signals are respectively plotted in the diagrams in the direction of the abscissa and in the direction of the ordinate. Nine of, for example, 100 control elements which are arranged distributed over the width of the material web are to be adjusted so as to produce at the end of the process the form of the measuring signals represented in FIG. 3. A standard deviation of $\sigma=1$ and the mean value zero may be assumed for the process noise. For the sake of simplicity, the temporal mean value of the transverse profile is to have the value zero over the entire width in this simulation. An individual transverse profile, such as in FIG. 4, is then composed additively of the effects of the minibumps and the noise. In this case, the measuring signals caused by the minibumps are completely lost in the process noise. If, then, a plurality of successive transverse profiles which are composed of the minibump effects and the noise are superimposed, for example, 10 times, the result after these $i2=10$ superimpositions is the transverse profile according to FIG. 5. It is seen that the summed effects of the minibumps—the determined interference—already begin to assert themselves noticeably with respect to the undetermined total process noise, and that after, for example, 25 such superimpositions the result for the measuring signals is the characteristic represented in FIG. 6, the analysis of which already permits a very reliable identification of the location of the cause of the minibumps, that is to say the respective location of action of the actuator. In principle, such an analysis becomes more reliable with each further superimposition, that is to say the signals caused by the minibumps stand out ever more clearly from the total noise, the larger the number $i2$ of superimpositions.

The aim will be to select the number of the superimpositions $i2$ to be undertaken to be only so large that the actuators can be reliably identified, because the method according to the invention can be carried out only in periods in which no correcting controller interventions of the process computer become necessary and there is otherwise a need to terminate. If, for the purpose of identification, the amplitudes of the measuring signals are evaluated by comparison with a detection threshold, it has proved to be expedient to select this detection threshold to be equal to half the product of the number $i2$ of the superimpositions and the amplitude of the profile changes effected by the actuator adjustment. The summing up, that is to say the continuing superimposition of the measuring signals is terminated when a number of measuring signals which corresponds to the number of the actuators causing minibumps overshoots this detection threshold in terms of their amplitude, there being the need, in addition, further to perform a plausibility test as to whether this overshooting also occurs at the expected location. This expected location can be determined with some reliability on the basis of empirically determined shrinkage curves. In the case of the examples represented, these criteria would result in the detection thresholds of 5 and 12.5 respectively illustrated in FIGS. 5 and 6.

Figure 9:
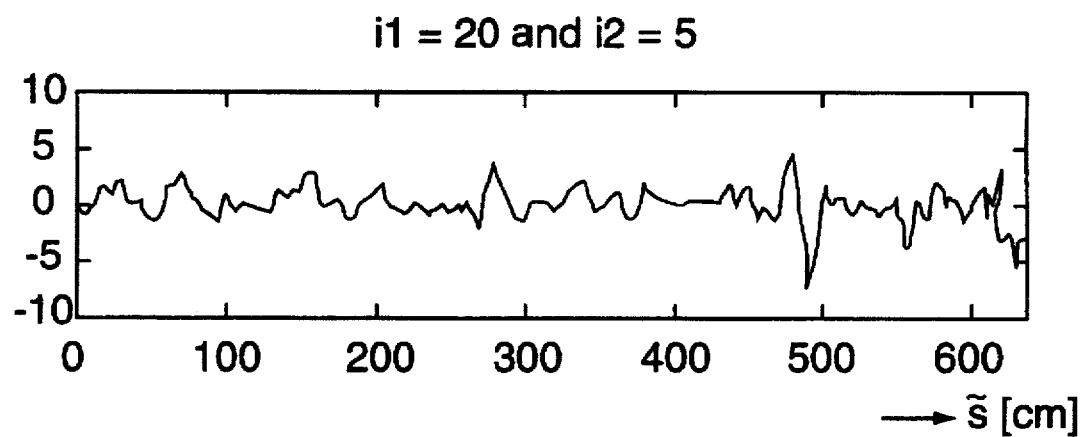
Figure 10:
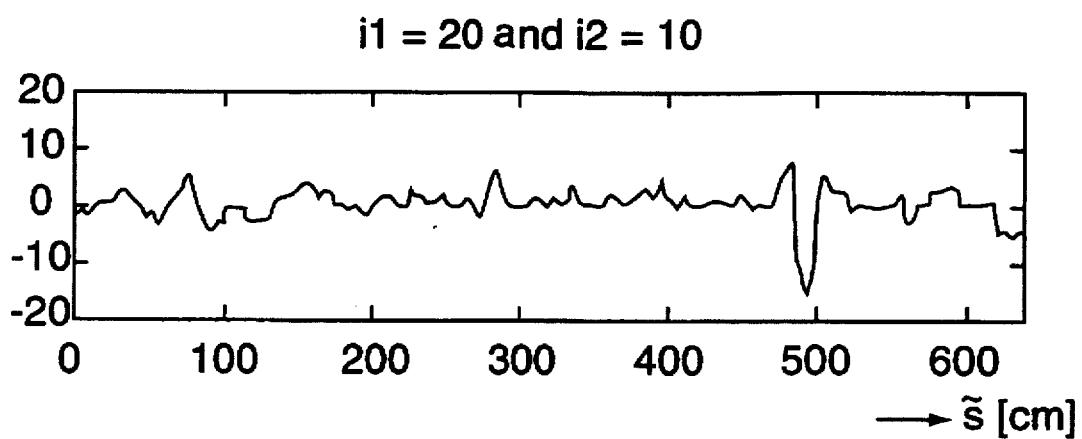
Figure 11:
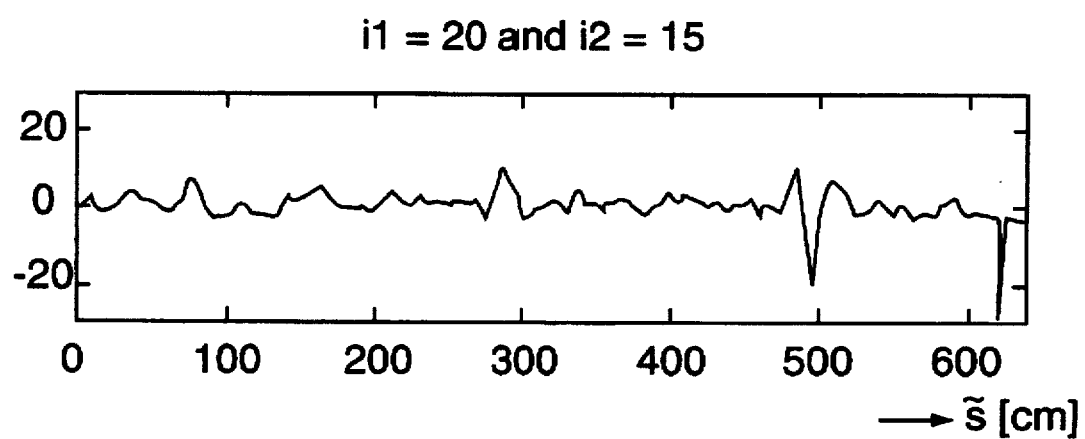
Figure 7:
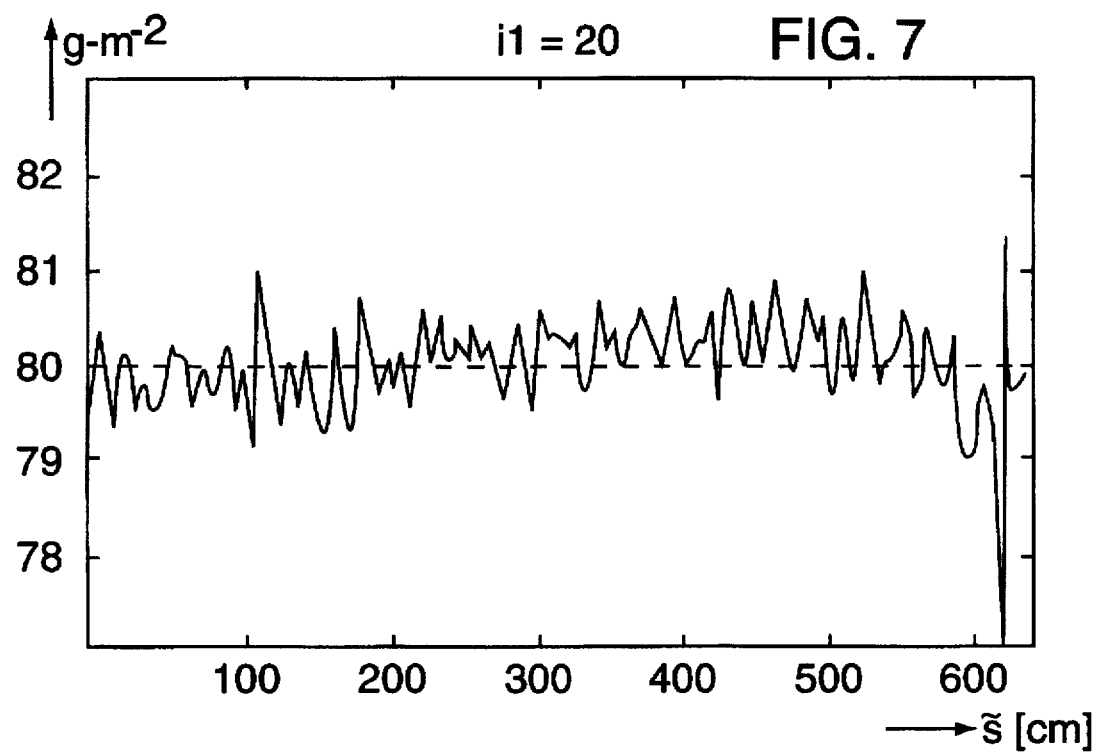
FIG. 7 shows a mean value of the transverse profile determined from a number of successive measurements for the case of a paper machine.
Figure 12:
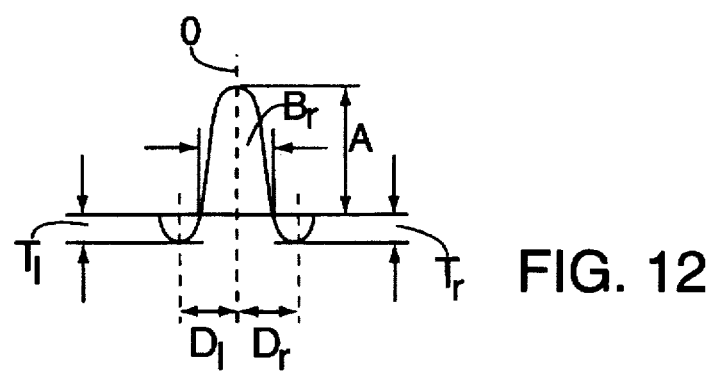
FIG. 12 shows, together with its characterizing quantities, a shape of measuring signal typical of an actuator to be identified.

The results of basis weight transverse profile measurements in the case of a paper machine are represented in FIGS. 7 to 11. FIG. 7 shows the mean value, determined from the $i1=20$ measurements succeeding one another in time, of the transverse profile in the case of a paper web width of 6.4 m, which mean value is temporally constant in each measuring zone but fluctuates spatially about a value of 80 g/m$^2$. In accordance with the identification method according to the invention, this mean value was subtracted from the transverse profiles measured below, and the results thereby obtained were summed up in each case, that is to say superimposed. FIGS. 9 to 11 respectively show the final results after i2=5, i2=10 and i2=15 superimpositions. For the sake of clarity, only three actuators having minibumps of the same amplitude were actuated, the direction of one minibump being different from that of the two others. The measured characteristics in accordance with FIGS. 8 to 11 reveal the same effect as in the case of FIGS. 4 to 6, specifically that the ratio of the measuring signal amplitudes caused by the minibumps to the amplitudes of the stochastic noise signals becomes larger with a rising number of superimpositions, with the result that the actuators can be identified in the way already described. In this case, they are at 72 cm, 283 cm and 493 cm. Instead of evaluating the amplitudes of the measuring signals by comparison with a detection threshold, it is frequently expedient, because of the non-ideal behavior of the paper machine and its actuators, to evaluate the measuring signals with the aid of typical signal patterns by means of pattern recognition. A typical signal pattern for the effect of a minibump is shown in FIG. 12. This signal pattern has a maximum with the absolute amplitude value A and the base width Br, as well as secondary minima on both sides of the maximum at the distance D1 and Dr, respectively, these secondary minima having the depths T1 and Tr. In the case of the pattern according to FIG. 12, T1=Tr and D1=Dr. It has proved to be successful for the purpose of actuator identification to search for patterns corresponding to FIG. 12 in the case of signal shapes obtained after the individual superimpositions, the characteristics D1, Dr and Br having been found directly, while a constant ratio was set up in the case of the ratio of the absolute values of the principal maximum and secondary minima.

Figure 13:
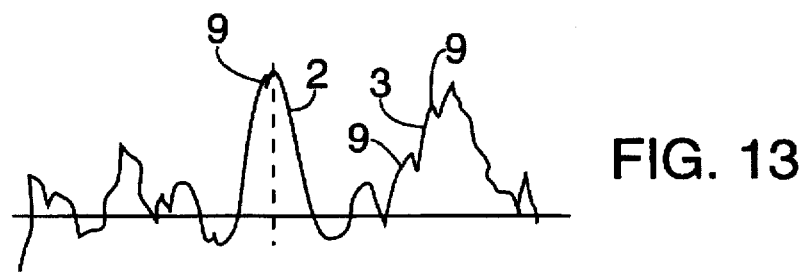
FIG. 13 shows a corresponding shape of measuring signal which can be observed in practice.

FIG. 13 shows an example of the signal shape 2 which was actually generated by a minibump, can clearly be seen to have the typical shape in accordance with FIG. 1 and thereby differs significantly, in conjunction with approximately the same amplitude, from a signal shape 3 caused by some other interference. If the known classical methods of pattern recognition are applied such as, for example, in the book by Gonzales and Thomason "Syntactic Pattern Recognition", in particular chapter 4.3 "Automata for simple Syntax-directed Translation", pages 116 to 125, published by Edison-Wessly in 1978, or else the methods, which have recently become known, of pattern recognition by means of neural networks, described in the article by Kressel, Schürmann and Franke: "Neuronale Netze für die Musterklassifikation" ("Neural networks for pattern classification"), in "Mustererkennung 1991" ("Pattern recognition"), 13th DAGM symposium, Munich, October 1991, published by Springer-Verlag 1991, pages 1 to 19, the number of the superimpositions required for an identification by comparison with the previously described evaluation by comparison with a detection threshold can be drastically reduced without losing anything with respect to the reliability thereof.

The same advantage results in the case of pattern recognition with the use of the application, which is somewhat easier to handle, of the known fuzzy logic such as is described, for example, in particular with reference to its implementation in the article by Preuss: "Fuzzy-Control— werkzeugunterstützte Funktions-Realisierung für Automatisierungsgeräte und Prozessleitsysteme" ("Fuzzy-control— tool-assisted function realisation for programmable controllers and process control systems") in "Automatisierungstechnische Praxis 34" (1992) 8, pages 451 to 460.

Figure 14:
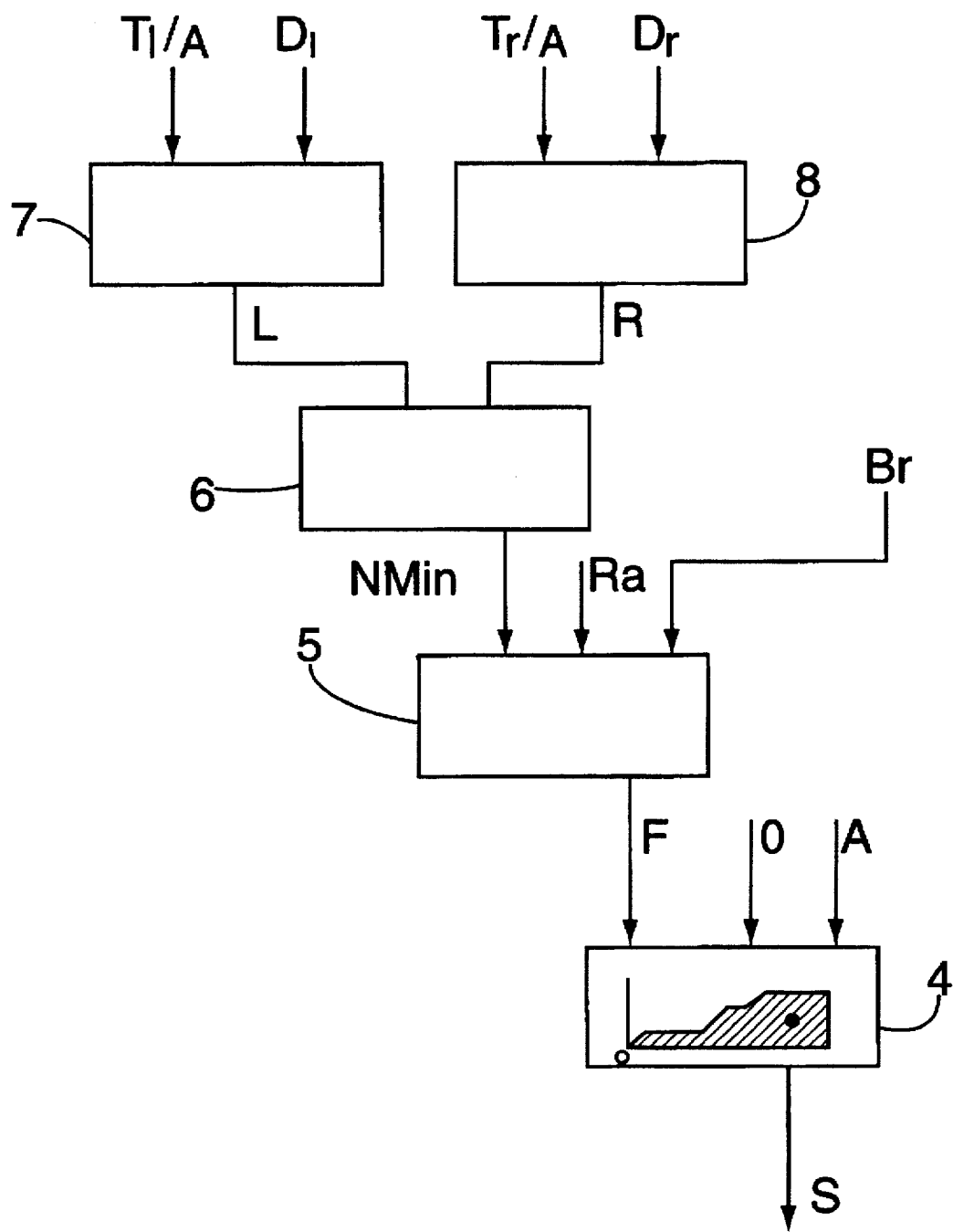
FIG. 14 shows the principle of the structure of a hierarchically stepped fuzzy-logic controller.

FIG. 14 shows a block diagram for a multistage fuzzy-logic controller suitable for the purposes of the invention. Its last stage, denoted by 4, is fed the amplitude A of the measuring signals, their detection location O at the process end and a variable F, characterizing the shape of the measuring signals, as input variables. The input variables F, O, A are converted in a known way via corresponding membership functions into truth values which state to which degree the respective value of the input variable belongs to linguistic values defined by the membership functions. After this step, denoted as fuzzification, the truth values relevant for the individual rules are subjected in accordance with AND/OR connections to a min or max operation, respectively, from which the respective truth value for the complete if part of each rule follows. Examples of such rules are: "if the amplitude is large and the location as expected and the shape is good, the measuring signal under investigation is to be ascribed with high reliability to a minibump" or "if the amplitude is large and the location unexpected and the shape is moderate, it is not very likely that the measuring signal under investigation is to be ascribed to a minibump". By means of so-called inference, the complete "if" part of each rule is logically combined with the "then" part and finally retranslated subsequently by means of a step denoted by defuzzification, for example in accordance with the centroid method as represented in the block denoted by 4, into a concrete numerical value which is situated between zero and one and forms the output variable S of the fuzzy controller. The closer this value is situated to one, the more likely it is that the measuring signal under investigation is to be ascribed to a minibump. In a stage 5, of a higher level than the last stage 4, the value of the input variables F—of the shape—is worked out correspondingly from the input variables Br, Ra and NMin, Br being the width of the measuring signal (compare FIG. 12) and Ra a variable which is characteristic of the roughness of the signal characteristic. A comparison of the two signal shapes represented in FIG. 13 makes it plain that the signal characteristic denoted by 2 is not as rough as in the case of the signal shape denoted by 3. The number of the secondary maxima denoted by 9 in FIG. 13, for example, could be used as measure for the roughness Ra. The input variable, denoted by NMin, of the fuzzy-logic block 5, which is to a certain extent characteristic of the shape of established secondary minima, is correspondingly worked out, in turn, in a block 6, which is at a higher level than said block. The truth value of these variables becomes particularly large whenever a shape is found which is good relative to the left-hand secondary maximum and the right-hand secondary maximum. The shape of the secondary minima is determined respectively in blocks 7 and 8. The input variables of these blocks 7 and 8, respectively, respectively consist in the distances D1 and Dr of the two minima from the axis of symmetry (compare FIG. 12) as well as in the ratio of the amplitude of the left-hand or of the right-hand secondary minimum to the principal amplitude A of the measuring signal. Output variables are the left-hand and the right-hand secondary minimum shapes L and R.

Figure 15:
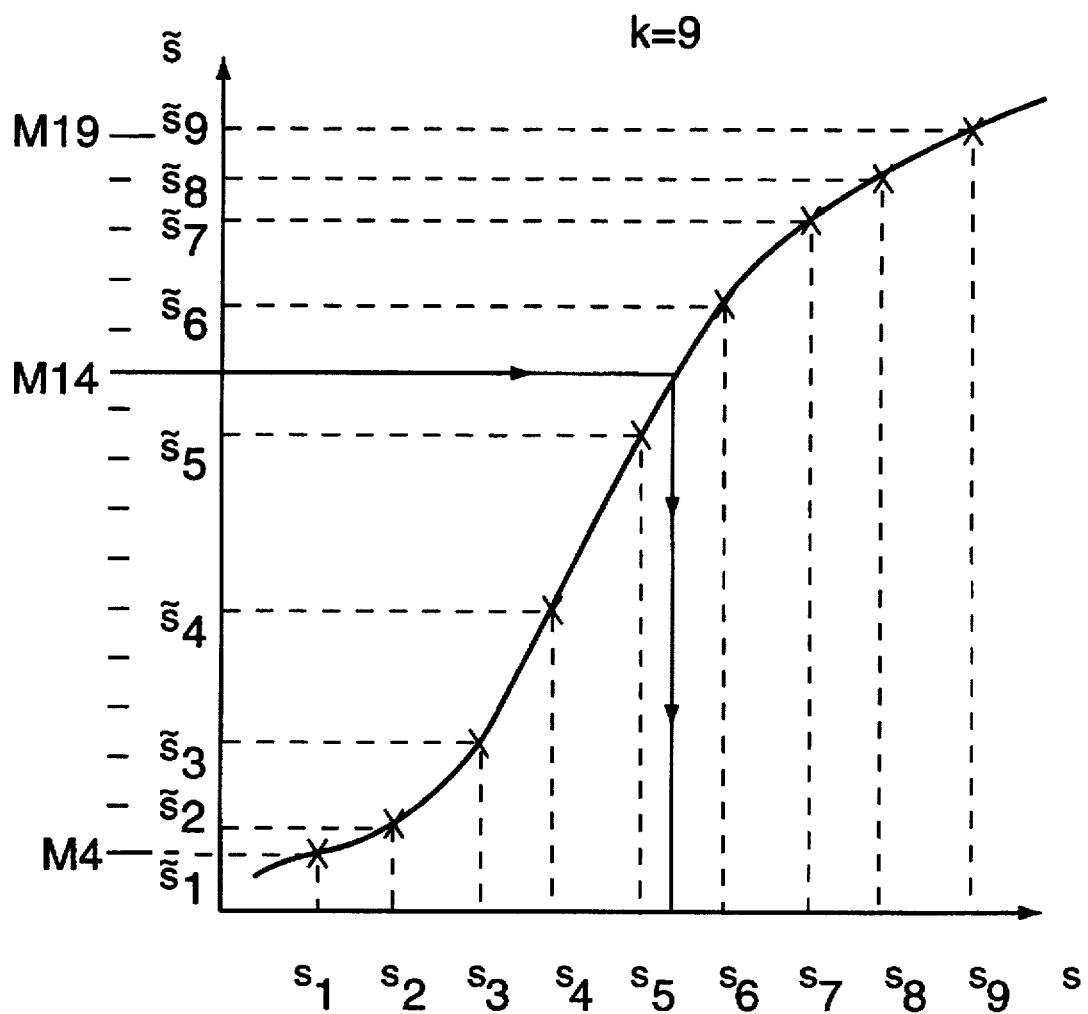
FIG. 15 shows an interpolation diagram for assigning actuators not directly identified to corresponding measuring zones.

FIG. 15 shows the results of the identification method according to the present invention in a diagram. For k=9 actuators having the coordinates s1 to s9 in the coordinate direction transverse to the web, the associated coordinates s1 to s9 are determined for those locations at the end of the process at which their adjustments are noticeable. These assignments are plotted in the diagram of FIG. 15, and yield 9 points marked by a cross. If these points are used as support points for a suitable interpolation function, it is also possible for the remaining, not explicitly identified actuators to be assigned by means of the intermediate values of this interpolation function to the locations of their respective effect. It therefore becomes possible to determine for each measuring zone at the end of the process the precise actuator which must be actuated in order to accomplish a change in the transverse profile in this measuring zone. If, for example, it is assumed that the actuator St1 having the coordinate s1 from the measuring zone M4 (compare FIG. 2) and the actuator St9 having the coordinate in the web transverse direction s9 of the measuring element M19 have been identified, and if a change in transverse profile is to be effected in the measuring zone M14, it would be necessary to actuate an actuator whose s coordinate in the web transverse direction is situated between those of the actuators St5 and St6 and whose precise value is yielded by the inverse function of the interpolation function represented in FIG. 14.

What is claimed is:

1. A method for actuator identification during the transverse profile control of a continuous material web such as a paper or plastic web, comprising the steps of:

a) determining the temporal mean value of a transverse profile at a web end from a number of successive measurements with manipulated variables held constant;

b) storing the determined temporal mean value;

c) adjusting a specific number of identified actuators using identical absolute values which have an effect on the web end only within a noise level of the transverse profile;

d) measuring a transverse profile of the web;

e) subtracting the temporal mean value obtained in step a) from the transverse profile measured in step d);

f) repeating steps d) and e) to the accompaniment of superimposition of the results obtained thereby, until a number of measuring signals, which corresponds to the number of identified actuators stands out in a clearly recognizable fashion in terms of amplitude and shape from the superimposed noise components of the transverse profile.

2. The method of claim 1, wherein the amplitudes of said measuring signals are evaluated by comparison with a detection threshold which depends on the number of the superimpositions and the amplitude of the profile change effected by the actuator adjustments.

3. The method of claim 2, wherein said actuators are respectively adjusted by such an absolute value that the profile change thereby effected corresponds to a standard deviation of the noise transverse profile.

4. The method of claim 1, wherein said measuring signals are evaluated with the aid of typical signal patterns by means of pattern recognition.

5. The method of claim 4, wherein the pattern recognition is carried out by means of a hierarchically stepped fuzzy-logic controller a last stage of said controller having as inputs the amplitude (A), the shape (F) and the expected location (O) of said measuring signals, and the output variable being the reliability (S) of detection for the profile changes effected by the actuator adjustments, it being the case that the shapes of the measuring signals are evaluated in higher-level stages which are fed as input variables the roughness and the width of said measuring signals as well as the distance and the depth, referred to the amplitude, of the right-hand or the left-hand secondary maxima, respectively.

6. The method of claim 4, wherein said actuators are respectively adjusted by such an absolute value that the profile change thereby effected corresponds to a standard deviation of the noise transverse profile.

7. The method of claim 1, wherein said actuators are respectively adjusted by such an absolute value that the profile change thereby effected corresponds to a standard deviation of the noise transverse profile.

8. The method of claim 7, wherein the adjustment is undertaken with the actuators distributed equidistantly over the entire width of the web.

9. The method of claim 1, wherein the adjustment is undertaken with the actuators distributed equidistantly over the entire width of the web.

10. The method of claim 1, wherein an assignment of the remaining actuators to corresponding measuring zones at the web end is performed by means of an interpolation function which contains as support points the values of the number of the identified actuators which has been determined.

11. A programmed device for carrying out a method for actuator identification during the transverse profile control of a continuous material web, comprising:

a) means for determining and storing a temporal mean value of a transverse profile at a web end from a number of successive measurements with manipulated variables kept constant;

b) means for adjusting a specific number of identified actuators with the same absolute values, which have an effect on the web end only within the noise level of the transverse profile;

c) means for iterative measurement of a transverse profile of the web, accompanied by respective subtraction of the stored temporal mean value from said measurement;

d) means for superimposing the results from the operation of element (c) and for discontinuing the iteration when a number of measuring signals, which corresponds to the actuators to be identified, stands out in a clearly recognizable fashion in terms of amplitude and shape from the superimposed noise components of the transverse profile.

12. The device of claim 11, comprising means for evaluating the amplitudes of said measuring signals by comparison with a detection threshold which depends on the number of the superimpositions and the amplitude of the profile change effected by the actuator adjustments.

13. The device of claim 11, comprising means for evaluating said measuring signals with the aid of typical signal patterns by means of pattern recognition.

14. The device of claim 13, comprising means for carrying out the pattern recognition by using a hierarchically stepped fuzzy-logic controller, having a last stage with inputs including the amplitude (A), the shape (F) and the expected location (O) of the measuring signals, and an output variable being the reliability (S) of detection for the profile changes effected by the actuator adjustments, it being the case that the shapes of the measuring signals are evaluated in higher-level stages which are fed as input variables the roughness (Ra) and the width (Br) of the measuring signals as well as the distance and the depth, referred to the amplitude, of the right-hand or the left-hand secondary maxima, respectively.

15. The device of claim 11, comprising means for respectively adjusting the actuators by such an absolute value that the profile change thereby effected corresponds to the standard deviation of the noisy transverse profile.

16. The device of claim 11, comprising means for adjusting actuators distributed equidistantly over the entire width of the web.

17. The device of claim 11, comprising means for assigning the remaining actuators to corresponding measuring zones at the web end by using an interpolation function which contains as support points the values of the number of the identified actuators which has been determined.

* * * * *